United States Patent Office 3,481,989
Patented Dec. 2, 1969

3,481,989
SUBSTITUTION OF AROMATIC COMPOUNDS
Jerome A. Vesely, Park Ridge, and Louis Schmerling, Riverside, Ill., assignors to Universal Oil Products Company, Des Plaines, Ill., a corporation of Delaware
No Drawing. Filed June 1, 1967, Ser. No. 642,736
Int. Cl. C07c 41/00, 39/00, 37/00
U.S. Cl. 260—613          8 Claims

ABSTRACT OF THE DISCLOSURE

The nuclear substitution of aromatic compounds is effected by treating said aromatic compound with a peroxy compound in the presence of hydrogen fluoride at substitution conditions.

---

This invention relates to a process for the nuclear substitution of aromatic compounds and is particularly concerned with a process for the nuclear hydroxylation of certain aromatic compounds utilizing a peroxy compound as the hydroxylation agent. More particularly yet, the nuclear hydroxylation of said compounds is effected in the presence of a catalyst comprising hydrogen fluoride.

Hydroxylated aromatic compounds are finding a wide variety of uses in the chemical field. For example, hydroquinone is an important chemical which is utilized in photographic developers, in dye intermediates, in medicines, as an antioxidant for fats and oils, as an inhibitor in coating compounds for rubber, stone and textiles, in paints and varnishes as well as in motor fuels and oils. In addition, it is an intermediate for preparing mono- and dibenzyl ethers of hydroquinone, the latter compounds being used as stabilizers, antioxidants, or solvents as well as being used in perfumes, plastics and pharmaceuticals. Catechol, another dihydroxybenzene, finds a wide variety of uses as an antiseptic, in photography, dyestuffs, antioxidants and light stabilizers. Furthermore, it is an intermediate for the preparation of the dimethyl ether of catechol which is used as an antiseptic and for the methyl ether of catechol which is guiacol, said guiacol being an important component of many medicines.

Likewise, phenol and cresols are used in phenolic resins, as disinfectants, flotation agents, surfactants, scouring compounds, lube oil additives, photographic developers and as intermediates in ink, paint and varnish removers. In addition, hydroxy-substituted aromatic carbohydrate derivatives may be used as intermediates in detergents, water-soluble pharmaceuticals, explosives, gelling agents, surface coatings, resins and oxidation inhibitors.

Other compounds which may also be prepared according to the process of the present invention will find a wide variety of use in the chemical field, a specific example of this being a product obtained by the reaction of phenol with di-t-butyl peroxide, said product being 4,4'-isopropylidenediphenol which is known in the trade as Bisphenol-A, a common component of epoxy resins.

It is therefore an object of this invention to provide a process for preparing substituted aromatic compounds.

A further object of this invention is to prepare hydroxylated and other useful products by introducing certain substituents into the nucleus of an aromatic compound.

In one aspect, an embodiment of this invention resides in a process for the nuclear substitution of an aromatic compound which comprises treating said compound with a peroxy compound selected from the group consisting of diaralkyl and diarachyl peroxides in the presence of hydrogen fluoride at hydroxylation conditions, and recovering the resultant substituted aromatic compounds.

A specific embodiment of this invention is found in a process for the nuclear hydroxylation of an aromatic compound which comprises treating phenol with di-t-butyl peroxide in the presence of hydrogen fluoride at ambient temperature, and recovering t-butyl phenol, hydroquinone and 4,4'-isopropylidenediphenol.

Other objects and embodiments will be found in the following further detailed description of this invention.

As was hereinbefore set forth, the present invention is concerned with a process for preparing useful compositions of matter including compounds in which at least one hydroxyl substituent is introduced on the ring of an aromatic compound, said hydroxylation being effected by treating an aromatic compound with a peroxy compound in the presence of a catalyst comprising hydrogen fluoride. The starting materials which may be utilized in the process of this invention comprises aromatic hydrocarbons and derivatives thereof. The term "aromatic compound" as used in the present specification and appended claims will refer to these hydrocarbons and derivatives thereof and will include in particular the alkylated aromatic compounds such as toluene, o-xylene, m-xylene, p-xylene, ethylbenzene, cumene (isopropylbenzene), n-propylbenzene, n-butylbenzene, t-butylbenzene, cyclohexylbenzene, 1-methylnaphthalene, 2-methylnaphthalene, 1-ethylnaphthalene, 2-ethylnaphthalene, 1,2-dimethylnaphthalene, 1,2-diethylnaphthalene, methylbiphenyl, ethylbiphenyl, etc.; hydroxy-substituted aromatic compounds such as phenol, hydroquinone, catechol, resorcinol, 1-hydroxynaphthalene, 2-hydroxynaphthalene, 1,2-dihydroxynaphthalene, etc.; alkylphenols such as m-methylphenetole, o-methylphenetol, p-methylphenetole, etc.; aroxy-substituted aromatic compounds such as diphenyl ether, etc., o-cresol, m-cresol, p-cresol, etc.; alkoxy-substituted aromatic compounds such as anisole, phenetol, n-propoxybenzene, o-methylanisole, m-methylanisole, p-methylanisole, p-ethylanisole, m-ethylanisole. In addition, it is also contemplated within the scope of this invention that halogenated aromatic hydrocarbons or other halogen-containing aromatic compounds such as o-chlorotoluene, m-chlorotoluene, p-chlorotoluene, o-bromotoluene, m-bromotoluene, p-bromotoluene, o-chloroethylbenzene, m-chlorethylbenzene, 2-chloro-1-methylnaphthalene, 2-bromo-1-methylnaphthalene, 4-chloro-1-methylnaphthalene, 4-bromo-1-methylnaphthalene, 2-chloro-1-ethylnaphthalene, 4-bromo-1-ethylnaphthalene, etc., 2-chlorophenol, 5-chloro-1-naphthol, etc., may also be used. In addition, carbohydrate derivatives of aromatic compounds such as 1,1-diphenyl-1-desoxy-D-glucitol, 1,1-ditolyl-1-desoxy-D-glucitol, 1,1-bis(p-isopropylphenyl)-1-desoxy-D-glucitol, 1,1-bis(p-methoxyphenyl)-1-desoxy-D-glucitol, 1,1 - bis(p-hydroxyphenyl)-1-desoxy-D-glucitol, the corresponding aromatic derivatives of other hexoses (fructose, sorbose, tagatose, psicose, idose, gulose, talose), glycolaldehyde, trioses, tetraoses, pentaoses, etc., may also be used. It is to be understood that the aforementioned compounds are only representative of the type of aromatic compounds and derivatives thereof which may be used as starting materials in the process of this invention and that said invention is not necessarily limited thereto. In general, it is contemplated that the utilizable aromatic derivatives may be represented by the following generic formula:

$$R_m ArX_o$$

in which Ar is a monocyclic or polycyclic aromatic hydrocarbon nucleus, R is independently selected from the group consisting of alkyl, cycloalkyl, hydroxyl, alkoxy and hydroxyalkyl radicals, X is independently selected from the group consisting of hydrogen, and halogen and carbohydrate substituents, while $m$ and $n$ are integers of at least 1. In general, unsubstituted aromatic hydrocarbons such as benzene, naphthalene, etc., may also be reacted according to the process herein set forth, although not necessarily with equivalent results.

The peroxy compounds which are utilized to treat the aromatic compounds of the type hereinbefore set forth in greater detail preferably comprises dialkyl peroxides or diaralkyl peroxides. Representative examples of suitable dialkyl peroxides which may be used include dimethyl peroxide, diethyl peroxide, di-n-propyl peroxide, diisopropyl peroxide, di-n-butyl peroxide, di-t-butyl peroxide, dicyclopentyl peroxide, dicyclohexyl peroxide, etc. Diaralkyl peroxides which may be used include dibenzyl peroxide, di(p-methylbenzyl) peroxide, di(o-methylbenzyl) peroxide, bis(tribenzylmethyl) peroxide, etc. It is also contemplated within the scope of this invention that other peroxy compounds may also be used, although not necessarily with equivalent results. Examples of these peroxides include trans-annular peroxides such as 1,4-epidioxy-p-menthane, etc., peroxyacetals such as those which may be formed by the reaction of a hydroperoxide with a ketone or an aldehyde including 2,2-di(t-butyl-peroxy)-butane, etc.

The process of this invention to prepare useful chemical compounds is effected by treating an aromatic compound with the peroxy compound in the presence of a catalyst comprising hydrogen fluoride. It is preferred that the reaction be effected in a substantially anhydrous medium inasmuch as the presence of water will tend to dilute the catalyst which is preferably charged to the reaction zone in anhydrous form. For example, when the concentration of the hydrogen fluoride catalyst falls below a figure of about 60 to about 70%, the reaction will slow down and eventually cease; therefore, it is necessary to maintain the concentration of hydrogen fluoride in an amount greater than 60% and preferably greater than 80%. It is also contemplated, if so desired, that an additional compound such as boron trifluoride or a ferrous fluoborate having the formula:

$$FeF_2 \cdot BF_3$$

may be utilized as a promoter to increase the catalytic activity and thereby permit the reaction to proceed in such a manner as to provide increased yields of the desired product. The aforementioned reaction is effected under hydroxylation conditions which will include temperatures ranging from about $-10°$ up to about $100°$ C. or more and preferably at a temperature in the range of from about $0°$ to about $40°$ C. The reaction pressure which is utilized will preferably comprise ambient pressure, although somewhat higher pressures which are provided for by the introduction of a substantially inert gas such as nitrogen into the reaction zone may be used, the pressure being that which is necessary to maintain a substantial portion of the reactants and the catalyst in the liquid phase.

The obtention of either a mono-hydroxylated aromatic compound or a polyhydroxylated aromatic compound may be varied according to the amount of aromatic compound which is to be treated with the peroxy compound. For example, if a monohydroxylated aromatic compound is desired, an excess of the starting aromatic compound will be used. Conversely speaking, if a polyhydroxylated aromatic compound comprises the desired product, the relative amount of peroxy compound which is used to treat the aromatic compound will be increased. Generally speaking however, the aromatic compound will be present in a mole ratio in the range of from about 3:1 to about 15:1 moles of aromatic compound per mole of peroxy compound, although greater or lesser amounts of aromatic compounds may also be used.

The process of the present invention may be effected in either a batch or continuous type operation. For example, when a batch type operation is used, a quantity of the starting material comprising the aromatic compound is placed in an appropriate apparatus such as, for example, a turbomixer or rotating autoclave along with the hydrogen fluoride catalyst. The peroxy compound is then added and the reaction is allowed to proceed for a predetermined time under the hydroxylation conditions hereinbefore set forth in greater detail. The residence time which is used to effect the treatment of the aromatic compound may vary from about 0.5 hour up to about 5 hours or more in duration. Upon completion of the desired residence time, the catalyst is purged from the reactor using a stream of inert gas such as nitrogen and the reaction product is thereafter recovered from the reactor. Following this, the reaction product is subjected to conventional means for recovery, said means including washing the product with an inert organic solvent such as for example benzene, toluene, xylene, n-pentane, n-hexene, etc., neutralization of any hydrogen fluoride which may still be present, flashing off the solvent and subjecting the reaction product to fractional distillation to recover the desired compounds.

It is also contemplated that the process of this invention may be effected in a continuous manner of operation. When such a process is used, the aromatic compound is continuously charged to the reaction zone which is maintained at the proper operating conditions of temperature and pressure. In addition, the peroxy compound is continuously charged to the reaction zone through the same or a separate line. The reaction is allowed to proceed in the presence of a hydrogen fluoride catalyst which is either present in the reactor or which may be continuously charged to said reactor during the residence time. Following this, the reactor effluent is continuously withdrawn and subjected to a treatment similar to that set forth in the above paragraph whereby the desired products are recovered.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4 - dihydroxyethylbenzene, 2 - hydroxy-p-cymene, 2-hydroxy-1-methylnaphthalene, 2,4 - dihydroxy-1-methylnaphthalene, 1-hydroxy-2 - methylnaphthalene, 1,4 - dihydroxy-2-methylnaphthalene, 2 - hydroxy - 1-methylanthracene, 2,4-dihydroxy-1-methylanthracene, catechol, hydroquinone, hydroxyquinone, pyrogallol, guaiacol, 4-hydroxyanisole, 2-hydroxyphenetole, 2,4 - dihydroxyanisole, 2,4-dihydroxyphenetol, 2 - hydroxy-p-methylanisole, 2-hydroxy-p-ethylanisole, 2-hydroxy-o-chlorotoluene, 2 - hydroxy-o-bromotoluene, 4-hydroxy-o-chlorotoluene, 4 - hydroxy-o-bromotoluene, 5-hydroxy-o-chlorotoluene, 5-hydroxy-o-bromotoluene, 1,1-di-(p-hydroxyphenyl) - 1 - desoxy-D-glucitol, 1,1-di-(p-hydroxyphenyl) - 1 - desoxy-D-mannitol, etc., propylphenol, n-butylphenol, t-butylphenol, di-t-butylphenol, n-butyltoluene, di-n-butyltoluene, mono-t-butyltoluene, di-t-butyltoluene, 4,4'-isopropylidenediphenol, etc. It is to be understood that the aforementioned compounds are only representative of the type of compounds which may be prepared and that the present invention is not necessarily limited thereto.

The following examples are given to illustrate the process of the present invention which, however are not intended to limit the generally broad scope of the present invention therewith.

Example I

In this example, 282 g. (3.0 moles) of phenol and 30.7 g. (0.21 mole) of di-t-butyl peroxide were reacted in a 1 liter stainless steel turbomixer autoclave at a temperature of about 25° C. in the presence of 20 moles of HF. The entire contact time for the reaction was approximately 85 minutes. At the end of this time, the autoclave was opened and the hydrogen fluoride removed by means of a nitrogen purge. The reaction mixture was transferred to a beaker. The parts of the reactor were washed with benzene and were then added to the reaction product. The solution was decanted into another beaker thereby separating out two product segments, one of which was benzene soluble and the other ether soluble. The extracts were treated to remove residual hydrogen fluoride and subjected to distillation to remove the solvents. The neutralized solution was subjected to analysis by means of infra-red and found to contains 60.9 mole percent of t-butylphenol, 24.8 mole percent of 4,4'-isopropylidenediphenol and 4.4 mole percent of hydroquinone.

Example II

In this example, 276 g. (3.0 moles) of toluene and 276 g. (13.8 moles) of HF were sealed in a stainless steel turbomixer autoclave. The autoclave was maintained at a temperature of about 28° C. while 32 g. (0.22 mole) of di-t-butyl peroxide was added, the reaction mixture being continuously subjected to mixing during the addition. The contact time of the reaction was about 60 minutes at the aforesaid temperature. At the end of this time, the autoclave was flushed with nitrogen to remove the hydrogen fluoride, said flushing being continued for a period of about two hours before the autoclave was opened.

The reaction product was transferred to a beaker and the reactor was washed with benzene. The resulting solution was decanted into another beaker thereby separating out a small amount of the aqueous phase which contained some benzene-insoluble product. The decanted benzene solution was treated to remove residual hydrogen fluoride, filtered under suction and distilled to remove benzene and unreacted toluene. The benzene-insoluble product which remained in the reactor was combined with the product in the aqueous liquid phase and extracted with ether. The extract was treated to remove residual hydrogen fluoride and subjected to distillation to remove the ether. Following this, the bottoms from the product segments were combined and subjected to fractional distillation under reduced pressure. The product which was recovered was analyzed by means of infrared analysis and found to contain 50.8 mole percent of t-butyltoluene, 1.8 mole percent of di-t-butyltoluene and 8.4 mole percent of a mixture of o-cresol, p-cresol and m-cresol.

We claim as our invention:

1. A process for the nuclear substitution of an aromatic compound selected from the group consisting of benzene, naphthalene and biphenyl each having 1 or 2 nuclear substituents selected from the group consisting of lower alkyl, lower alkoxy, phenoxy, hydroxy, chlorine and bromine, which process comprises reacting, at a temperature of about 0° C. to about 40° C., one mole proportion of a di-lower alkyl peroxide with from about 3 to about 15 mole proportions of said aromatic compound in the presence of a molar excess of hydrogen fluoride at a concentration of at least about 60% HF, and recovering the resultant substituted aromatic compounds.

2. The process as set forth in claim 1, further characterized in that said aromatic compound is a lower alkylbenzene.

3. The process as set forth in claim 1, further characterized in that said aromatic compound is a hydroxybenzene.

4. The process as set forth in claim 1, further characterized in that said aromatic compound is a lower alkoxybenzene.

5. The process as set forth in claim 1, further characterized in that said peroxide is di-t-butyl peroxide.

6. The process as set forth in claim 5, further characterized in that said aromatic compound is toluene and said substituted aromatic cresol.

7. The process as set forth in claim 5, further characterized in that said aromatic compound is phenol and said substituted aromatic hydroquinone.

8. The process as set forth in claim 5, further characterized in that said aromatic compound is anisole and said substituted aromatic 4-hydroxyanisole.

References Cited

UNITED STATES PATENTS

| 2,423,470 | 7/1947  | Simons | 260—624 XR |
| 2,660,610 | 11/1953 | Erchak | 260—624 XR |
| 3,407,237 | 10/1968 | Vesely | 260—621    |

OTHER REFERENCES

Reid et al.: Jour. Amer. Chem. Soc., vol. 72 (1950), pp. 5232–5236.

Walling: Free Radicals in Solution (1957), pp. 469–471.

BERNARD HELFIN, Primary Examiner

U.S. Cl. X.R.

260—210, 618, 619, 620, 621, 623, 625, 626